United States Patent [19]

Kuno et al.

[11] Patent Number: 4,524,313
[45] Date of Patent: Jun. 18, 1985

[54] ERROR DETECTING MECHANISM FOR SERVOSYSTEM

[75] Inventors: Toshitaka Kuno; Hiroshi Moribe, both of Nagoya; Atsushi Kamiya, Kariya, all of Japan

[73] Assignee: Kabushiki Kaisha Toyota Chuo Kenkyusho, Japan

[21] Appl. No.: 463,579

[22] Filed: Feb. 3, 1983

[30] Foreign Application Priority Data

Feb. 12, 1982 [JP] Japan ................................. 57-21804

[51] Int. Cl.$^3$ ............................................. G05B 9/02
[52] U.S. Cl. .................................. 318/563; 318/565; 318/663; 318/603; 364/184; 361/23
[58] Field of Search ............... 318/563, 565, 602, 663, 318/603, 614; 364/184, 185; 361/23

[56] References Cited

U.S. PATENT DOCUMENTS 3,463,979  8/1969  Scobie et al. ...................... 318/565
4,207,507  6/1980  Hermie .............................. 318/663
4,364,002  12/1982 Suzuki et al. ..................... 318/614

Primary Examiner—B. Dobeck
Attorney, Agent, or Firm—Parkhurst & Oliff

[57] ABSTRACT

The invention relates to a mechanism wherein a relative rotary angle of a driving motor is detected by use of an encoder, and, if an error occurs in a servo control action when the driving motor is servo-controlled in accordance with a deviation value of the relative rotary angle from a desired rotary angle of the driving motor, then the servo control action is brought to an emergency stop. A potentiometer for detecting an absolute rotary angle of the driving motor is connected to a rotary shaft of the driving motor and said emergency stop is effected when a difference between said absolute rotary angle and said relative rotary angle exceeds a preset tolerance value, so that an error in the servo control action can be reliably prevented.

14 Claims, 2 Drawing Figures

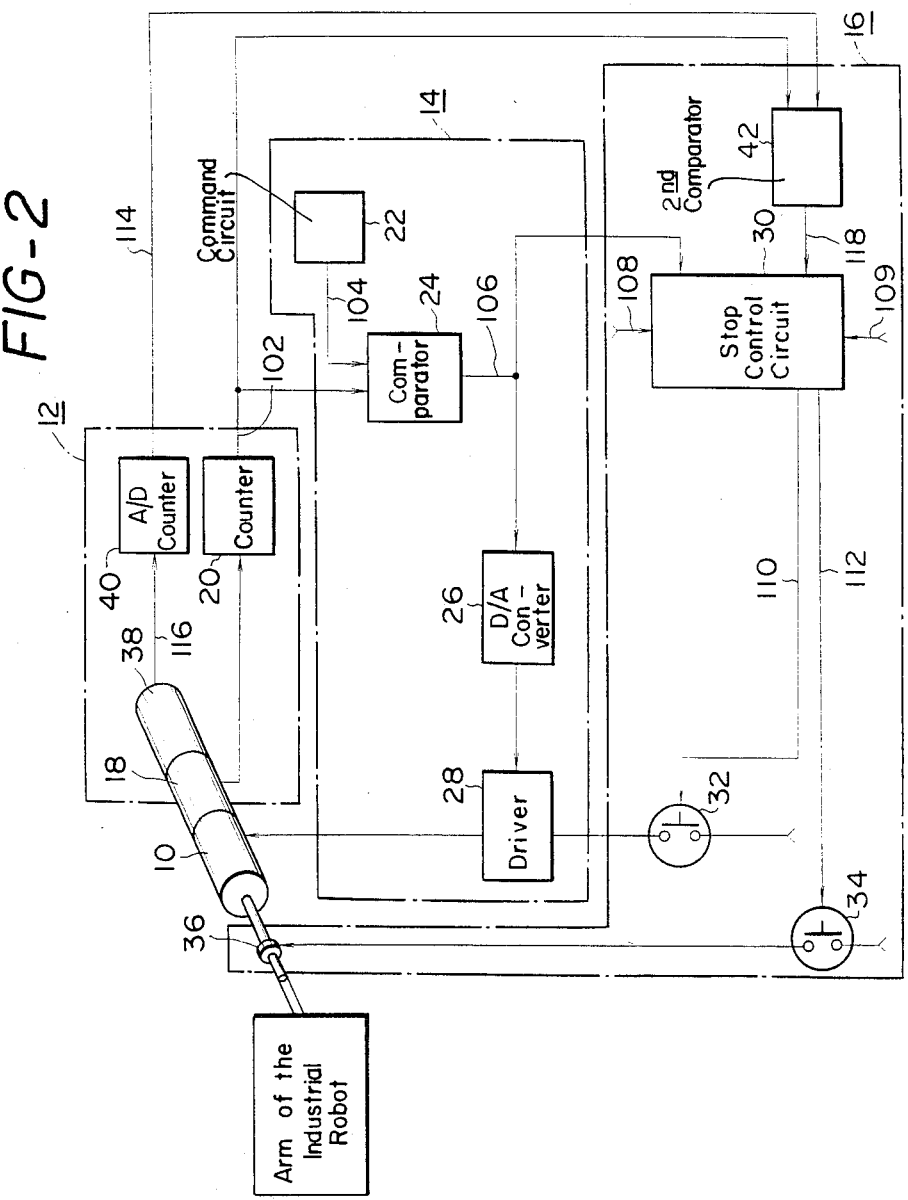

ERROR DETECTING MECHANISM FOR SERVOSYSTEM

BACKGROUND OF THE INVENTION

1. Field of the Invention

This invention relates to an error detecting mechanism for a servosystem, capable of preventing servo malfunctions in a driving motor caused by errors such as a disconnection, short-circuit and disturbance noises in a servo loop system.

2. Description of the Prior Art

As well known, servomotors have been widely utilized in the field of position measurement control and the like, and in order to prevent malfunctions in the servomotors, heretofore, there have been used error detecting mechanisms for servosystems.

FIG. 1 shows the conventional error detecting mechanism provided on joint portions of arms and mechanical hand of an industrial robot, for a driving motor 10 (a DC motor) to drive these joint portions.

As will be described hereunder, the mechanism of the type described comprises a rotary angle detecting system 12 for detecting a rotary angle of a driving motor 10, a driving controlling system 14 for driving and controlling the driving motor 10 and an error preventing system 16 for effecting an emergency stop of the driving motor 10 on servo malfunction of the driving motor 10.

Referring to FIG. 1, the rotary angle detecting system 12 is housed together with the driving motor 10 in a motor unit, and comprises an encoder 18 directly connected to a rotary shaft projecting from behind the driving motor 10 and a counter 20 supplied with an output pulse train 100 outputted from the encoder 18 and counting the same. The counter 20 is reset when an arm of an industrial robot is brought into a reference posture for starting the industrial robot in operation, and thereafter, can count the output pulse train 100 outputted from the encoder 18 during operation of the industrial robot.

Furthermore, the driving-controlling system 14 includes a rotary angle commanding circuit 22 for commanding a rotary angle of the driving motor 10 and a comparator 24 supplied with a relative rotary angle detection value 102 from the counter 20 and a rotary angle command value (a desired rotary angle) 104 from the rotary angle commanding circuit 22 and extracting a deviation value of the relative rotary angle detection value 102 from the rotary angle command value 104, and can drive and control the driving motor 10 in accordance with a deviation value 106 outputted from this comparator 24. More specifically, in this driving-controlling system 14 of this driving motor 10, the deviation value 106 from the comparator 24 is converted into an analogue value by a D/A converter 26 and supplied to a driver 28 to drive the driving motor 10, with the result that the rotary angle of the driving motor 10 is feedback-controlled to a value corresponding to the rotary angle command value 104.

The above-described error preventing system 16 of the conventional mechanism is of such an arrangement that, when the deviation value 106 from the comparator 24 exceeds a preset servo deviation tolerance value (a threshold value), an emergency stop of the driving motor 10 is effected. More specifically, in FIG. 1, the deviation value 106 from the comparator 24 is supplied to an emergency stop control circuit 30 provided in the error preventing system 16 and storing a servo deviation tolerance value 108, and the emergency stop control circuit 30 can output an open-command signal 110 and a close-command signal 112 simultaneously when the deviation value 106 exceeds the telerance value 108. This open-command signal 110 causes a contact 32 to be opened, whereby a current supply to the driver 28 is cut off to stop the driving motor 10 in operation, and the close-command signal 112 causes a contact 34 to be closed, whereby a current (AC) is supplied to a brake 36 provided in the aforesaid motor case, to thereby effect an emergency stop of the driving motor 10.

The conventional mechanism shown in FIG. 1 is of the above-described arrangement. Description will hereunder be given of operation thereof.

As described above, for starting the industrial robot in operation, the arm is brought into the reference posture and the counter 20 is reset. Then, the joint portion of the arm starts rotation from the rotary angle command value 104 as being the initial value, this rotation causes the output pulse train 100 from the encoder 18 to be counted by the counter 20, and the relative rotary angle detection value 102 is supplied to the comparator 24. The deviation value 106 outputted from this comparator 24 acts so as to cause a rotary angle of the driving motor 10 to coincide with the command value 104, to thereby effect a servo control.

When an error occurs in the driving motor 10 during the above-described servo control and the deviation value 106 exceeds the tolerance value 108 preset in the emergency stop control circuit 30, the driver 28 is stopped in operation by the open-command signal 110 and the close-command signal 112, both of which are outputted from the emergency stop control circuit 30 and the brake 36 acts, whereby the driving motor 10 is brought to an emergency stop.

However, the conventional mechanism described above has been monitoring a possible error during the servo control of the driving motor 10 only by use of the output pulse train 100 from the encoder 18. In consequence, if the encoder 18 is thrown into disorder and the feedback (the relative rotary angle detection value 102) to the driving-controlling system 14 is cut off, then a drift of the driver 28 causes the driving motor 10 to begin to rotate, whereby the deviation value 106 is not varied even if an error occurs, so that the emergency stop control circuit 30 cannot detect a malfunction of the driving motor 10. In consequence, there has been a possibility of loss of error detecting function for the driving motor 10, thereby resulting in the disadvantage of lowered reliability.

SUMMARY OF THE INVENTION

The present invention has been developed to obviate the above-described disadvantages of the prior art and has as its object the provision of an error detecting mechanism for a servosystem, capable of improving a reliability of a servo error preventing function for a driving motor to a considerable extent.

To achieve the above-described object, the error detecting mechanism according to the present invention features that the mechanism comprises: a rotary angle detecting system including an encoder connected to a rotary shaft of a driving motor, for detecting a relative rotary angle of the driving motor and a potentiometer for detecting an absolute rotary angle of the driving motor; a driving-controlling system for driving and controlling the driving motor in accordance with a deviation value of a rotary angle detection value of the driving motor from a desired rotary angle; and an error preventing system for preventing a malfunction of the servosystem. The error preventing system is provided with an emergency stop control circuit for effecting an emergency stop of the driving motor when a deviation value between the relative rotary angle detection value detected by the encoder and the absolute rotary angle detection value detected by the potentiometer exceeds a preset tolerance value.

Description will hereunder be given of the preferred embodiment of the error detecting mechanism for a servosystem according to the present invention with reference to the drawings.

BRIEF DESCRIPTION OF THE DRAWINGS

FIG. 2 is a block diagram showing the error detecting mechanism for the servosystem, to which the present invention is applied.

DESCRIPTION OF THE PREFERRED EMBODIMENT

Figure 1:
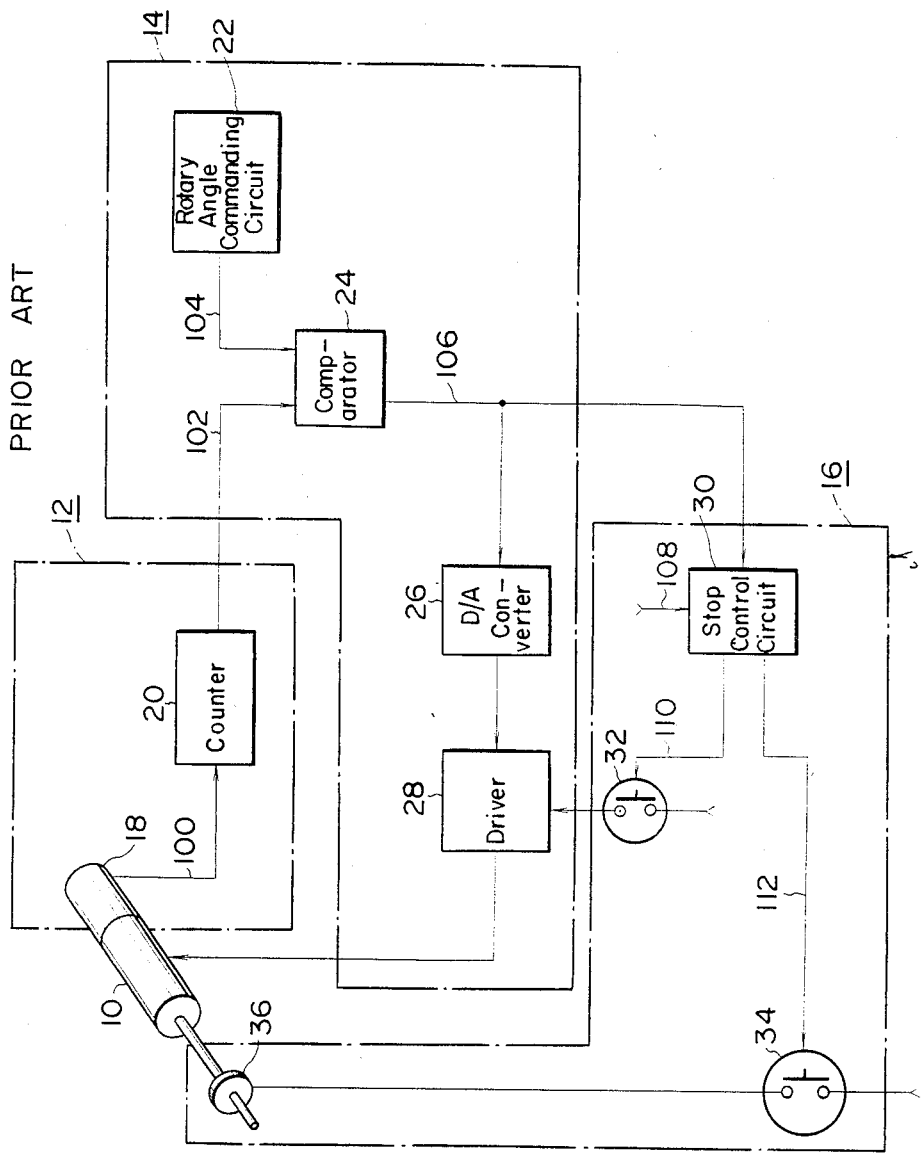
FIG. 1 is a block diagram showing the conventional error detecting mechanism for the servosystem.

FIG. 2 shows the error detecting mechanism for the servosystem according to the present invention. Same reference numerals as shown in FIG. 1 are used in FIG. 2 to designate same or similar parts, so that detailed description thereof will be omitted. In the same manner as in the conventional error detecting mechanism, in the present mechanism, the driving motor 10 for driving the joint portions of the arms and the mechanical hand of the industrial robot are servo-controlled.

As described above, the present invention features that the rotary angle detecting system includes a potentiometer connected to the drive shaft of the driving motor, for detecting the absolute rotary angle, and the error preventing system is provided with the emergency stop control circuit for effecting an emergency stop of the driving motor when the deviation value between the output pulse train detected by the encoder and the absolute rotary angle detected by the potentiometer exceeds the preset tolerance value. From this reason, in the present embodiment, an error detecting system 16 is provided with a potentiometer 38 housed in a motor unit and connected through a reduction gear to a rotary shaft projecting from behind a driving motor 10, for detecting an absolute rotary angle, with an A/D converter 40 for A/D converting an analogue detection value 116 outputted from this potentiometer 38, and further, with a second comparator 42 for comparing a relative rotary angle 102 with an absolute rotary angle detection value 114, and an emergency stop control circuit 30 can output an open-command signal 110 and a close-command signal 112 to contacts 32 and 34 when a deviation value 118 obtained by a comparator 42 for comparing a relative rotary angle (an output pulse) 102 integrated by a counter 20 with a detection value 114 outputted from the A/D conver 40 exceeds the preset tolerance value 109.

The embodiment of the mechanism shown in FIG. 2 is of the above-described arrangement. Description will now be given of operation thereof. In the same manner as in the conventional error detecting mechanism, in the present mechanism, the driving motor 10 is servo-controlled, for starting the mechanism, the counter 20 is reset, after the start the rotary angle of the driving motor 10 is servo-controlled in accordance with the deviation value 106 between the relative rotary detection value 102 and the rotary angle command value 104. At this time, if an error occurs in the driving motor 10 and the deviation value 106 exceeds the tolerance value 108, then the driving motor 10 is brought to an emergency stop by the emergency stop control circuit 30 in the same manner as in the conventional mechanism.

Furthermore, according to the present invention, when the encoder 18 is thrown into disorder and the feedback cannot be made to the driving-controlling system 14, the deviation value 118 obtained by the second comparator 42 is considerably increased and exceeds the tolerance value 109, whereby the driving motor 10 is brought to an emergency stop by the open-command signal 110 and the close-command signal 112 outputted from the emergency stop control circuit 30.

In consequence, according to the present invention, even when an error occurs in a feedback system including the encoder 18, the deviation value 106 between the relative rotary angle detection value 102 and the absolute rotary angle detection value 114 is increased, whereby the driving motor 10 is brought to an emergency stop by the emergency stop control circuit 30, so that the driving motor 10 can avoid running without control.

In addition, according to the present invention, even when an error occurs in the potentiometer 38, the deviation value 118 of the comparator 42 is increased, so that the driving motor 10 can be brought to an emergency stop.

As has been described hereinabove, according to the present invention, when the encoder 18 or the potentiometer 38 is thrown into disorder, the driving motor 10 is brought to an emergency stop, so that the reliability in the error detecting function for the driving motor 10 can be improved to a great extent.

What is claimed is:

1. An error detecting mechanism for a servosystem, comprising: a rotary angle detecting system including an encoder connected to a rotary shaft of a driving motor, for detecting a relative rotary angle of said driving motor and a potentiometer for detecting an absolute rotary angle of said driving motor; a driving-controlling system for driving and controlling said driving motor in accordance with a deviation value of a rotary angle detection value of said driving motor from a desired rotary angle; and an error preventing system for preventing a malfunction of said driving-controlling system; said error preventing system being provided with an emergency stop control circuit for effecting an emergency stop of said driving motor when a deviation value between said relative rotary angle detection value detected by said encoder and said absolute rotary angle detection value detected by said potentiometer exceeds a preset tolerance value.

2. An error detecting mechanism for a servosystem as set forth in claim 1, wherein said encoder is a rotary encoder.

3. An error detecting mechanism for a servosystem as set forth in claim 2, wherein said rotary encoder and said potentiometer are connected through a reduction gear to a shaft opposite to the drive shaft of said driving motor.

4. An error detecting mechanism for a servosystem as set forth in claim 3, wherein said driving motor is a DC motor.

5. An error detectting mechanism for a servosystem as set forth in claim 4, wherein said DC motor is provided at a joint portion of an arm of the industrial robot, for driving said arm.

6. An error detecting mechanism for a servosystem as set forth in claim 5, wherein said DC motor, rotary encoder and potentiometer are housed in one and the same motor unit.

7. An error detecting mechanism for a servosystem as set forth in claim 6, wherein said rotary angle detecting system includes a counter adapted to be reset when the industrial robot is started in operation, and thereafter, to count pulses outputted from said rotary encoder.

8. An error detecting mechanism for a servosystem as set forth in claim 7, wherein said rotary angle detecting system includes an A/D converter for converting an analogue detection value outputted from said potentiometer into a digital signal.

9. An error detecting mechanism for a servosystem as ser forth in claim 8, wherein said error preventing system includes a comparator for digitally comparing the relative rotary angle detection value outputted from said counter with the absolute rotary angle detection value outputted from said A/D converter.

10. An error detecting mechanism for a servosystem as set forth in claim 9, wherein said error preventing system includes an emergency stop control circuit for outputting an emergency stop command signal to said DC motor when a deviation value outputted from said comparator exceeds the preset tolerance value.

11. An error detecting mechanism for a servosystem as set forth in claim 10, wherein said error preventing system includes a brake for braking said DC motor and a contact for being 'ON' operated in response to a command signal outputted from said emergency stop control circuit to supply a driving current to said brake.

12. An error detecting mechanism for a servosystem as set forth in claim 11, wherein said driving-controlling system includes a rotary angle commanding circuit for commanding a rotary angle of said DC motor, a comparator for comparing the relative rotary angle detection value from said counter with the desired rotary angle from said rotary angle commanding circuit, an D/A converter for converting a deviation value of the relative rotary angle detection value from the desired rotary angle outputted from said comparator into an analogue signal and a driver for driving said DC motor in accordance with the deviation value converted into an analogue signal.

13. An error detecting mechanism for a servosystem as set forth in claim 12, wherein said error preventing system includes a contact for being 'OFF' operated in response to a command signal outputted from said emergency stop control circuit to cut off the current supplied to said driver.

14. An error detecting mechanism for a servosystem, comprising: a rotary angle detecting system including a rotary encoder connected to a rotary shaft of a DC motor for driving an arm of a industrial robot for detecting a relative rotary angle of said DC motor and a potentiometer for detecting an absolute rotary angle of said DC motor, said rotary encoder and said potentiometer being connected through a reduction gear to a shaft opposite to the drive shaft of said DC motor; a driving-controlling system for driving and controlling said DC motor in accordance with a deviation value of a rotary angle detection value of said DC motor from a desired rotary angle; and an error preventing system for preventing a malfunction of said driving-controlling system, said DC motor, said rotary encoder and said potentiometer being housed in one end of the same motor unit, said rotary angle detecting system including a counter adapted to be reset when the industrial robot is started in operation to count pulses outputted from said rotary encoder, and includes an A/D converter for connecting an analogue detection value outputted from said potentiometer into a digital signal.

* * * * *